May 12, 1925.  1,537,563
R. SUCZEK
EVAPORATING SYSTEM
Original Filed March 17, 1921
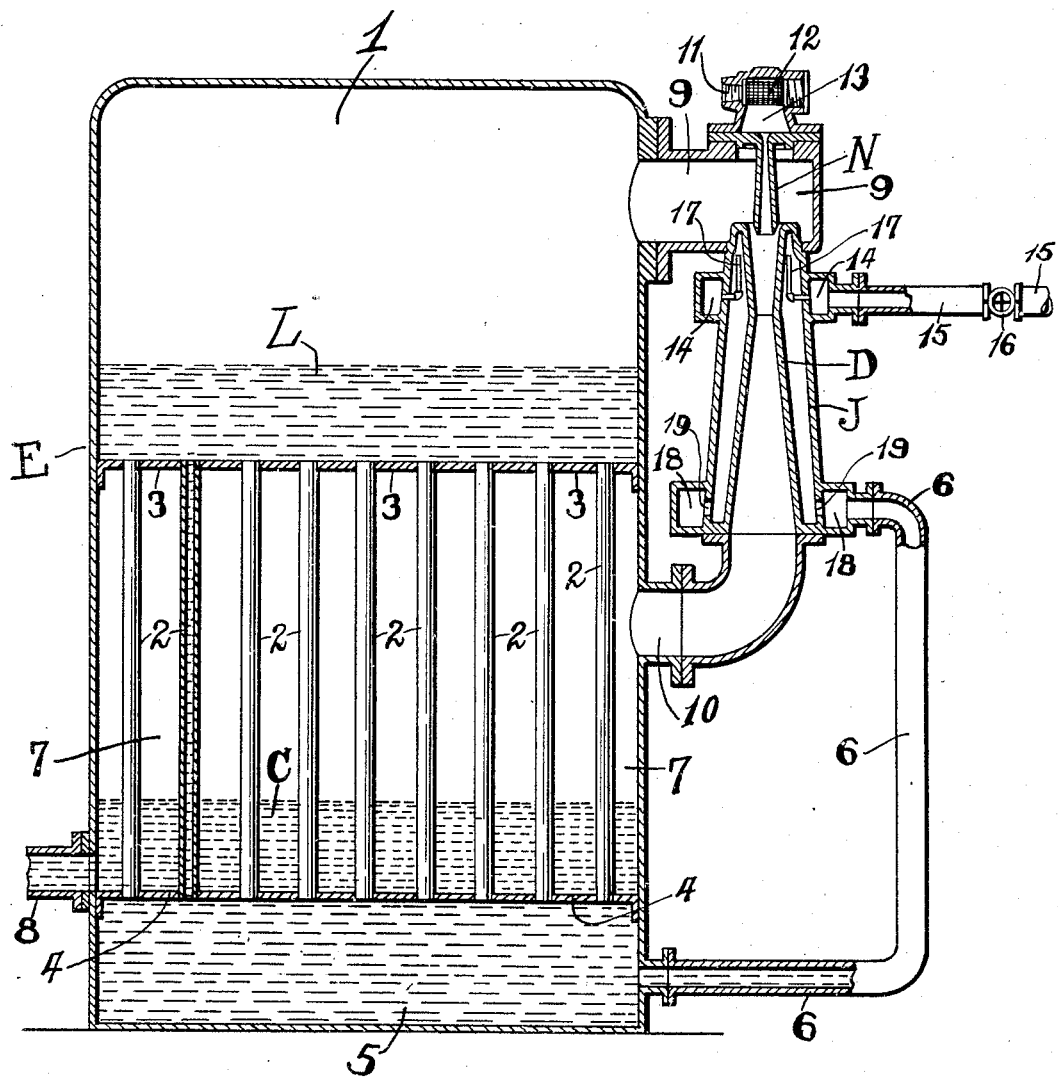
INVENTOR.
Robert Suczek
BY Cornelius D. Ehret
his ATTORNEY.

Patented May 12, 1925.

1,537,563

UNITED STATES PATENT OFFICE.

ROBERT SUCZEK, OF PHILADELPHIA, PENNSYLVANIA, ASSIGNOR TO C. H. WHEELER MANUFACTURING COMPANY, OF PHILADELPHIA, PENNSYLVANIA, A CORPORATION OF PENNSYLVANIA.

EVAPORATING SYSTEM.

Original application filed March 17, 1921, Serial No. 453,111. Divided and this application filed June 9, 1923. Serial No. 644,443.

*To all whom it may concern:*

Be it known that I, ROBERT SUCZEK, a citizen of the United States, residing in the city and county of Philadelphia, State of Pennsylvania, have invented certain new and useful Improvements in Evaporating Systems, of which the following is a specification.

My invention relates to a method of and apparatus for effecting evaporation of a liquid by reducing the pressure thereon, or by reducing the pressure thereon and applying heat thereto.

In accordance with my invention, an ejector, operating upon the principle of an aspirator, reduces the pressure upon the liquid to be evaporated by expansion of a suitable elastic motive fluid, preferably steam, into jet formation, and entraining the gases or vapors from the space above the liquid to be evaporated, and while the mixture of motive and entrained fluids is undergoing compression, as by conversion of velocity into pressure, heat is abstracted from the mixture and delivered to the liquid to be evaporated.

Further in accordance with my invention, the additional heat is transferred to the liquid to be evaporated from the mixture of motive and entrained fluids discharged by the ejector.

My invention resides in the method and apparatus of the character hereinafter described and claimed.

This application is a division from my co-pending application Serial No. 453,111, filed March 17, 1921.

For an understanding of my method, and for an illustration of one of the various forms my apparatus may take, reference is to be had to the accompanying drawing, which is a vertical sectional view, parts in elevation, of apparatus embodying my invention and utilizable for the practice of my method.

Referring to the drawing, E is an evaporator having the evaporating chamber 1 containing the liquid L to be evaporated, the liquid being delivered to the chamber 1 through the tubes 2, of brass or other good heat conducting material, communicating at their upper ends with the tube sheet 3 forming the bottom of the chamber 1, and at their lower ends with the tube sheet 4 forming a wall of the chamber 5, to which the liquid to be evaporated is delivered through the pipe 6. The tube sheets 3 and 4 are spaced from each other within the shell of the evaporator E to form the third chamber 7, from which the distillate or condensed evaporated liquid is conducted to suitable destination through the pipe 8.

Communicating with the chamber 1, in which there preferably exists a vacuum or pressure less than atmospheric pressure, is the suction chamber 9 of the ejector apparatus comprising the motive fluid expanding nozzle N and the diffuser or combining tube structure D, which latter discharges through the port 10 into the chamber 7. Elastic motive fluid under pressure, preferably steam, as live or high pressure steam, or exhaust or low pressure steam, is delivered through the pipe connection 11 and strainer 12 into the steam chest 13, from which it passes through the nozzle N, by which it is expanded into jet formation. The motive fluid moving at high velocity in the form of a jet entrains gases, and particularly vapors, from the chamber 1, producing and maintaining a desired absolute pressure therein preferably below atmospheric pressure, thus inducing evaporation of the liquid L, whose boiling point is lowered by reduction of the pressure in the chamber 1. The mixture of motive fluid and elastic fluid, as vapor or gas from the chamber 1 entrained thereby, is delivered into the diffuser structure, where the mixture loses in velocity and gains in pressure, and is eventually discharged at a pressure higher than that in the chamber 1 into the chamber 7, in which atmospheric pressure or a pressure above or below atmospheric pressure may obtain or be maintained, as may be suitable or desirable.

Surrounding the diffuser structure D is the cooling jacket J provided at its upper end with the annular chamber 14 delivering cooling liquid, delivered by the pipe 15 controlled by vavle 16, through a plurality of tubes or pipes 17 into the upper end of the cooling jacket. The annular chamber 18, at the lower end of the jacket J, receives the cooling medium through a series of ports 19 and discharges it through the pipe 6 to the chamber 5, from which it rises through the tubes 2, abstracting heat from the mixture discharged from the diffuser D, and passes into the evaporating chamber 1.

By the structure described, it will be seen that the liquid to be evaporated, as water, sea water, oil, gasolene, or other liquid, or a solution, as of salt, sugar, etc., is delivered through the pipe 15, and first abstracts heat from the mixture of motive and entrained fluids in its passage through the diffuser structure D, thereby effecting by the cooling action of the liquid to be evaporated an economy in consumption of motive fluid utilized by the ejector, because of increase of density of the fluid traversing the diffuser and as explained in my aforesaid application Serial No. 453,111 and in Letters Patent No. 1,282,977, October 29, 1918. The liquid to be evaporated, having thus preliminarily absorbed heat, is delivered through pipe 6 to the chamber 5 and thence to the tubes 2, where, as aforesaid, further heat is abstracted from the mixture of motive and entrained fluids discharged by the diffuser D. The liquid then reaches the evaporating chamber L with its temperature increased, the rise in temperature of the liquid assisting the evaporation.

In consequence, the evaporation is enhanced by the absorption of heat by the liquid to be evaporated from the diffuser structure of the ejector, and is further enhanced by the heat absorbed from the ejector discharge, the heat absorbed by the liquid necessitating a lesser degree of vacuum or effecting a certain rate of evaporation with a higher absolute pressure in the chamber 1, with resultant lesser consumption of motive fluid by the ejector to effect such absolute pressure, the motive fluid being further economized by the heat absorbed from the diffuser structure; and such heat as is absorbed from the mixture within the diffuser D is not lost, but is imparted to the liquid to be evaporated, with the result that less heat need be applied to the liquid while in the tubes 2 by the discharge from the ejector, to effect the same liquid temperature in the evaporating chamber 1.

The vapor discharged by the ejector into the chamber 7 is there condensed, forming the condensate C which is drawn off through the pipe 8. The condensate C is distilled water, in case sea water, as upon shipboard, is evaporated and used for boiler feed, drinking or other purposes.

While it is preferred that the liquid to be evaporated shall first abstract heat from the ejector, it will be understood that the liquid to be evaporated may be introduced directly into the chamber 5, and a separate and distinct cooling liquid may be circulated through the cooling jacket J, which may be desirable in case very low temperature cooling liquid is required in the jacket J.

What I claim is:

1. The method of evaporating liquid, which consists in expanding motive fluid, as steam, into jet formation, entraining thereby vapor evolved by said liquid, converting velocity of the mixture of motive fluid and vapor into pressure, and cooling said mixture while increasing in pressure.

2. The method of evaporating liquid, which consists in expanding motive fluid, as steam, into jet formation, entraining thereby vapor evolved by said liquid, converting velocity of the mixture of motive fluid and vapor into pressure, cooling said mixture while increasing in pressure, and delivering heat from said mixture to said liquid.

3. The method of evaporating liquid, which consists in expanding motive fluid, as steam, into jet formation, entraining thereby vapor evolved by said liquid, converting velocity of the mixture of motive fluid and vapor into pressure, and cooling said mixture while increasing in pressure by the liquid to be evaporated.

4. The method of evaporating liquid, which consists in expanding motive fluid, as steam, into jet formation, entraining thereby vapor evolved by said liquid, converting velocity of the mixture of motive fluid and vapor into pressure, cooling said mixture while increasing in pressure by the liquid to be evaporated, and delivering heat from said mixture to said liquid.

5. Evaporator structure comprising a vapor chamber to which the liquid to be evaporated is conducted, ejector apparatus for withdrawing vapor from said chamber, heat transfer structure for heating the liquid by the discharge from said ejector, and means for cooling the diffuser structure of said ejector.

6. Evaporator structure comprising a vapor chamber to which the liquid to be evaporated is conducted, ejector apparatus for withdrawing vapor from said chamber, said ejector apparatus comprising nozzle and diffuser structure, and means for cooling the diffuser structure of said ejector by the liquid prior to its entry into said vapor chamber.

7. Evaporator structure comprising a vapor chamber to which the liquid to be evaporated is conducted, ejector apparatus for withdrawing vapor from said chamber, said ejector apparatus comprising nozzle and diffuser structure, heat transfer structure for heating the liquid by the discharge from said ejector, and means for cooling the diffuser structure of said ejector by the liquid prior to its entry into said heat transfer structure.

In testimony whereof I have hereunto affixed my signature this 23rd day of May 1923.

ROBERT SUCZEK.